March 6, 1956     W. D. BROWN     2,737,359

LAUNCHING DEVICE FOR PARACHUTE

Filed June 21, 1954

INVENTOR
William Donald Brown

BY *Lancaster, Allwine & Rommel*
ATTORNEYS

United States Patent Office 2,737,359
Patented Mar. 6, 1956

2,737,359

LAUNCHING DEVICE FOR PARACHUTE

William Donald Brown, Farnham, England, assignor to Irving Air Chute Company, Inc., Lexington, Ky., a corporation of New York Application June 21, 1954, Serial No. 438,225

Claims priority, application Great Britain July 3, 1953

6 Claims. (Cl. 244—149)

The present invention relates to means for efficiently launching a parachute canopy.

The primary object of this invention is the provision of improved means for packing and launching a pilot parachute canopy, under such conditions that the same will be sufficiently distant from the main pack and main parachute canopy for proper deployment thereof, free of interference by the main pack and main parachute.

In conventional parachute pack and canopy mechanisms, where the pilot parachute is connected close to the peak of the main parachute, circumstances occur during launching which prevent the efficient and proper functioning of the pilot parachute as an anchor to insure proper deployment of the main parachute. It is therefore a purpose of this invention to provide improved means for ejecting a pilot parachute container a desired distance from the main pack or main canopy before releasing the pilot canopy, in order that the latter will properly open.

Other objects and advantages of this invention will be apparent during the course of the following detailed description.

In the accompanying drawing, forming a part of this specification, and wherein similar reference characters designate corresponding parts throughout the several views.

Figure 1:
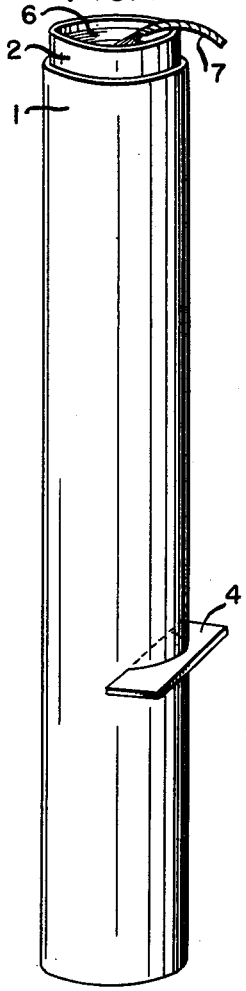
Figure 1 is a perspective view of one form of pilot parachute projector.
Figure 2:
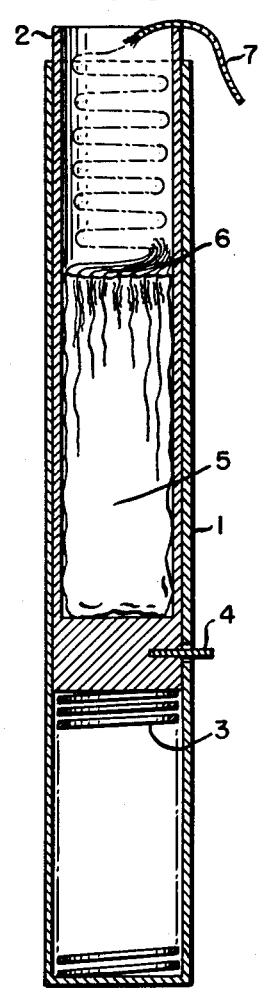
Figure 2 is a sectional side view of the device shown in Figure 1.

Referring to Figures 1 and 2, the device comprises an outer tube 1 and an inner tube 2 which is slidably received within the tube 1, such tubes being closed at one end or otherwise provided with abutments for the ends of a compression spring 3 which serves to actuate the device, but being open at the other ends. Such spring may for instance be of 1" diameter, 11" free length and 3¼" when fully compressed and afford a force of 120 lbs. under full compression, i. e., in the condition when the inner tube 2 is fully inserted in the outer tube 1. Any suitable trip mechanism, such as the trip 4, may extend through a slot in the outer tube 1 into engagement with the inner tube 2 for the purpose of releasably locking the tubes in their assembled and loaded condition.

The pilot parachute 5 and its associated shroud lines 6 are stowed in the inner tube 2 and a line 7 extends from such shroud lines to an anchorage e. g. such line extends into the pack of the main parachute for connection to the apex of such main parachute. In the equipment so far described the pilot parachute assembly is tightly packed in the inner tube 2 so that a certain amount of force is required for withdrawing it.

The aforesaid outer tube 1 may be secured to the pack of the main parachute or to any other suitable anchorage, and when the equipment is in use the operation is as follows:

Upon release of the trip device 4, which release may be brought about by manual control or by static line or other automatic control, the inner tube 2 with the contained parachute 5 is projected with considerable velocity out of the outer tube 1 and as it is of small bulk but possesses appreciable weight it can be projected even against a high speed airstream.

During the projection of the said inner tube, the line 7 will be payed out and upon its becoming taut and the parachute thereby becoming arrested, the inner tube will, as a result of its residual kinetic energy, continue its travel so becoming withdrawn from the parachute 5. The said parachute will accordingly be free to deploy and develop easily in a position where there is no risk of its being objectionably masked by the load or being liable to be held against such load by the airstream.

Figure 3:
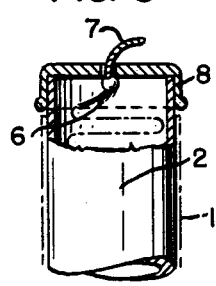
Figures 3 and 4 show two alternative detail modifications of the device shown in Figures 1 and 2.
Figure 4:
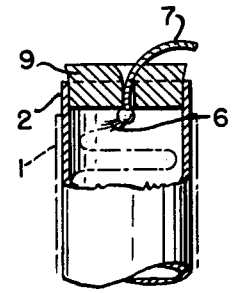

As an alternative to relying solely upon the tight packing of the parachute in the tube 2 for the purpose of opposing premature parting of the tube 2 from such parachute, such tube may be provided with an apertured cap, such as the cap 8 shown in Figure 3, or an apertured plug, such as the apertured plug 9 shown in Figure 4, through which the line 7 extends, such cap or plug making frictional engagement with the tube 2 and requiring an appreciable pull or jerk before it is itself withdrawn and accordingly frees the parachute for withdrawal. Such arrangements are advantageous because the pilot parachute can be wholly enclosed in its container and the parachute can be loosely packed so facilitating its eventual withdrawal.

Figure 5:
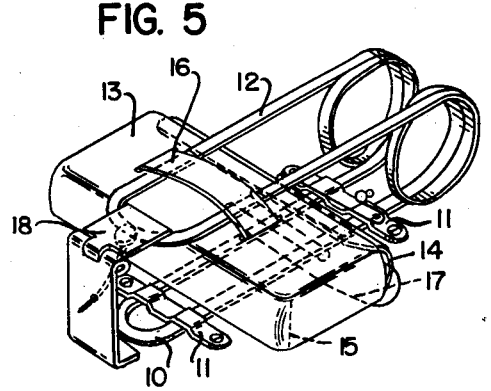
Figure 5 shows another form of pilot parachute projector in its fully assembled condition.
Figure 6:
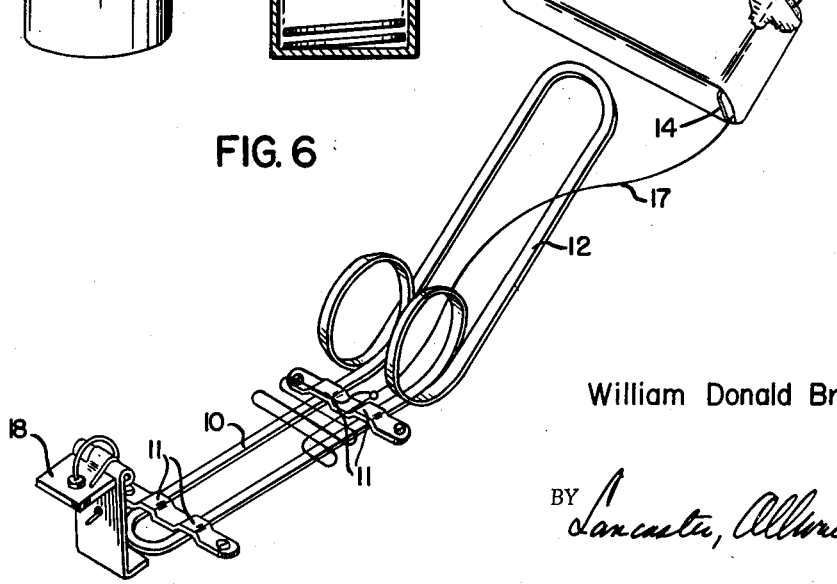
Figure 6 shows the equipment of Figure 5 in a released condition.

Referring now to Figures 5 and 6 the equipment comprises a strong spring of hair-pin form, of which one arm, portion or member 10 is secured to an anchorage for instance the load or the pack of the main parachute, by straps 11 or other securing devices. The other arm, portion or pack receiving member 12 of the said spring is movable from a position parallel or substantially parallel to the arm 10 as shown in Figure 5, in which position the maximum energy is stored in the spring convolutions which connect said arms, to a position in which the arms lie at an obtuse angle or possibly in a substantially straight line, such position corresponding to the released condition of the spring and being shown in Figure 6.

The pilot parachute for use with the projector device shown in Figures 5 and 6 is stowed in a small pack 13, such pack being closed at the end facing the axis of the spring by means of a tuck-in flap 14. It is desirable that the said pack should be of small dimension but of appreciable weight and we find that in some circumstances it is desirable to apply an additional weight thereto, such additional weight taking the form for instance of lead shot inserted in a pocket 15 located at the closed end of the pack as shown in Figure 6.

Upon assembly the pack 13 is slidably located on the arm 12 of the aforesaid spring, for instance by passing such arm through a tunnel formed by a tape, strap or the like 16, secured to the pack preferably at or about the centre of gravity of the loaded pack.

A line 17 extends from the pilot parachute to an anchorage, e. g. the apex of the associated main parachute, such line being stowed in a releasably supported zig-zagged or other condition so that it can be freely payed out to allow the pilot parachute to move a substantial distance away from its anchorage before the line 17 becomes taut.

Any suitable release device, such as the trip 18 is provided for releasably retaining the arm 12 of the spring in its loaded condition, such trip being itself releasable by manual pull on a rip cord or by the operation of a static line or other automatic device.

The aforesaid spring and pack 13 are preferably so designed that in the loaded condition the pack is wholly received in the space between the said arms 10 and 12 and located close to the free ends of such arms.

When the last described equipment is in use, release of the trip 18 and consequent freeing of the arm 12 of the spring will result in that arm moving through an arc with considerable force and velocity, and at some point during such movement the weighted pack 13, which is only slidably secured to such arm by the tunnel 16, will slide from such arm under centrifugal force and be hurled a considerable distance in a trajectory which will not be unduly affected by airstreams owing to the appreciable mass but comparatively low bulk of such pack. As the force required to open the tuck-in flap 14 of the pack is considerably greater than the opposition to paying-out of the line 17 such line will be in general fully payed out and be rendered taut before the flap is opened as a result of a pull exerted through that line. When however the line becomes taut, and further movement of the parachute in its line of travel becomes impossible, the flap 14 will become opened and the pack will slide from the parachute and continue its travel owing to its residual kinetic energy and result in the pilot parachute becoming freed for deployment in a position where it cannot be blanketed by the load or pressed against such load by any air pressure to which it may be subjected.

It is contemplated to use the means of this invention to project any type of collapsed or folded parachute canopy from its load and release and deploy the canopy only when it has become separated from the load by a distance appropriate for preventing such load from interfering with proper deployment.

Various changes in the shape, size and arrangement of parts and substitution of equivalents, such as the use of exploding charges or compressed gas, instead of spring action, for causing ejection of the parachute canopy may be used, without departing from the spirit of the invention or the scope of the claims.

What we claim is:

1. In a parachute canopy and pack launching mechanism a supporting portion adapted to be connected to a load or main parachute pack, a launching arm movably connected to said supporting portion, means for forcibly throwing the launching arm away from collapsed proximity to said supporting portion, a container, means for releasably connecting the container to said launching arm for forceful ejection into the air away from the launching arm upon movement of said arm by the throwing means, a parachute canopy releasably disposed in the container, and means connected to the canopy including a load connected or main parachute canopy connected cable of a predetermined length to insure release of the canopy from said container when the latter has been ejected a distance away from the launching arm sufficient to render the cable taut.

2. A parachute assemblage as defined in claim 1 wherein spring means is provided as the means for throwing the arm for release of the parachute container.

3. An assemblage as defined in claim 1 in which trip means is provided to releasably hold the launching arm in position for throwing.

4. In a parachute pack launching mechanism the combination of a supporting portion, a launching arm, convoluted spring means connecting said supporting arm and which when in sprung position holds the launching arm away from the supported portion, said launching arm being movable through contraction of the spring means to a collapsed position adjacent to the supporting portion, a parachute pack having a canopy stowed therein and having means releasably and slidably connecting it upon the launching arm, a flexible cable having means connected with the pack for releasing the parachute canopy stowed therein when said cable is rendered taut, and trip means for holding the launching arm with the pack thereon in set position, said spring means having sufficient energy stored therein when contracted to quickly throw the launching arm to an opened position upon release of the trip means with such force as to project the pack away from the launching arm for quickly rendering the cable taut to release and enable opening of the parachute canopy.

5. A parachute device adapted to be used in connection with descent support of a load comprising a container, a parachute canopy releasably disposed in the container under such circumstances that a predetermined amount of force is required to withdraw it from the container, launching means for connection to a load including ejecting means for forcibly projecting the container with the parachute canopy enclosed therein into space and away from the load, trip means for setting the launching means into operation, and an elongated flexible cable connected to the parachute canopy and adapted to be connected to a load and of sufficient length consistent with the projecting force of the ejection means to render the cable taut when the container has reached a predetermined distance from the load whereby to withdraw the canopy from the container.

6. In a parachute assemblage a launching device having means for connection externally to a main parachute canopy containing pack, a container, a pilot parachute canopy releasably packed in the container with means to hold it therein until sufficient force is exerted to free the pilot parachute canopy from said container, means for releasably connecting the container with the pilot parachute canopy packed therein upon the launching device, said launching device having ejecting means for forcibly projecting the container with its pilot parachute canopy packed therein into space away from said launching device, a cable connected to the pilot parachute canopy adapted to be associated with the pack for release of the main parachute therefrom and being of such length that when the container and pilot parachute canopy have been projected a predetermined distance by said ejecting means away from the launching device it will be rendered taut for pulling the pilot parachute canopy from its container and thereafter upon deployment of the pilot parachute canopy releasing the main parachute canopy from its pack.

References Cited in the file of this patent

UNITED STATES PATENTS

| | | |
|---|---|---|
| 1,019,858 | Tanner | Mar. 12, 1912 |
| 1,072,764 | Nagel | Sept. 9, 1913 |
| 1,785,770 | Faber | Dec. 23, 1930 |
| 1,823,758 | Owens | Sept. 15, 1931 |
| 2,036,279 | King | Apr. 7, 1936 |
| 2,502,470 | Martin | Apr. 4, 1950 |
| 2,519,923 | Noelcke | Aug. 22, 1950 |